Figure 7:
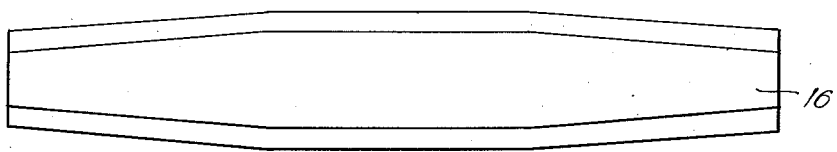

April 7, 1931. G. LANGFORD 1,799,382
RAIL JOINT AND BAR THEREFOR
Filed May 2, 1929 3 Sheets-Sheet 1
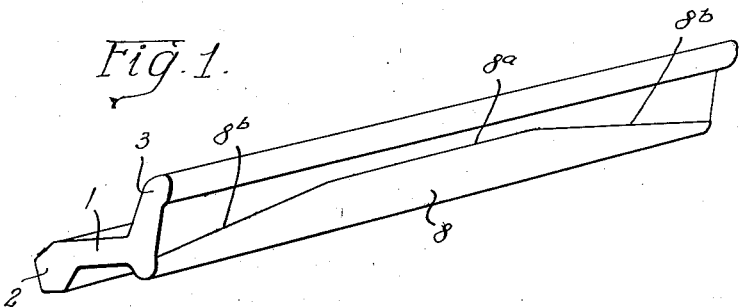
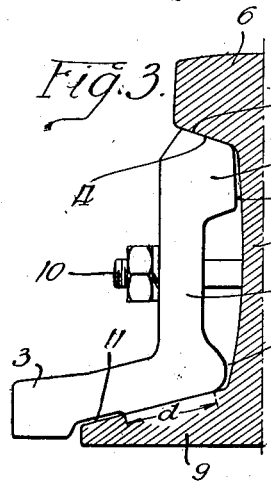
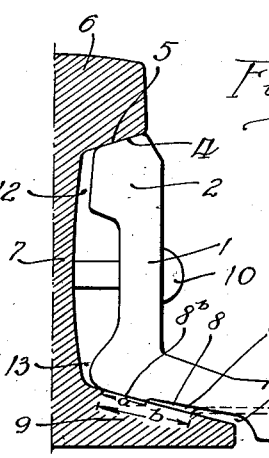
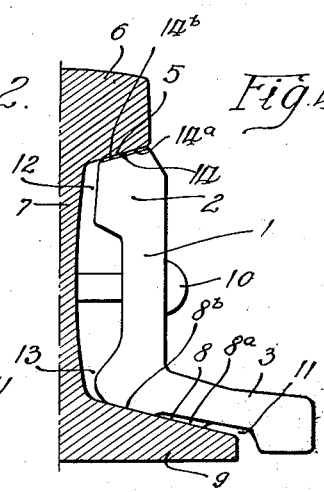
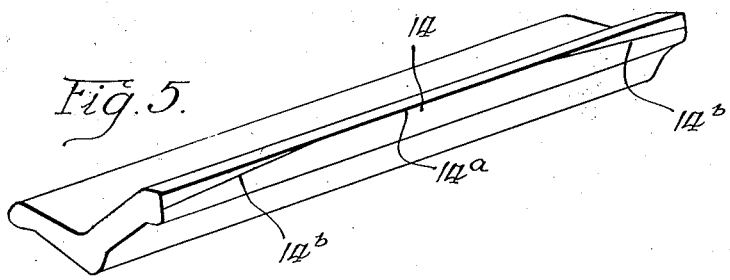
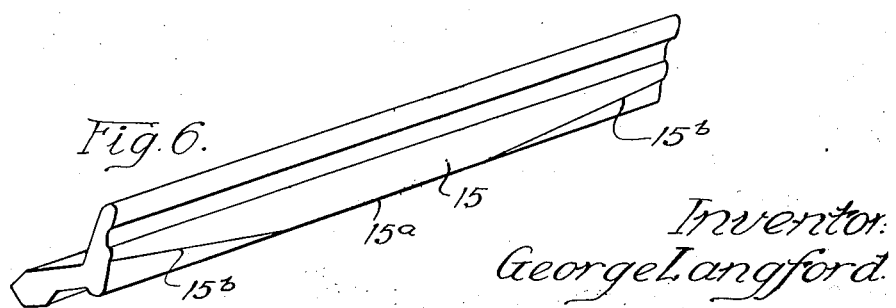
Inventor:
George Langford
By Brown, Jackson, Boettcher & Dienner
Attys April 7, 1931.  G. LANGFORD  1,799,382
RAIL JOINT AND BAR THEREFOR
Filed May 2, 1929  3 Sheets-Sheet 2

Inventor:
George Langford.
By Brown, Jackson, Boettcher & Dienner
Attys.

Patented Apr. 7, 1931

1,799,382

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RAIL JOINT AND BAR THEREFOR

Application filed May 2, 1929. Serial No. 359,761.

This invention relates to rail joints, and has to do more particularly with the construction of rail joint bars and their relation to the rail ends whereby excessive lateral inward flexing of the central portions of the bars is avoided.

In rail joints, two angle bars are placed at opposite sides of the rail ends and are held tight on their fishing or bearing surfaces by bolts passing through holes in the bars and the webs of the rail ends. When new bars of ordinary construction such as are now commonly used, are bolted to new rails, these bars are straight and parallel to each other and to the rails, the tension on the central bolts being the same as that on the end bolts and there being no vertical or lateral flexure of the bar. These are the conditions which obtain at the initial fitting of the bars to prepare the joint for service, when using straight and uncrowned bars of common type such as are ordinarily used in rail joints. During wear of the joint, in use, the relation between the bars and the rail ends alters and the bars are subjected to objectionable lateral flexing, the center bolts of the joints becoming subject to excessive tension. This is due to the fact that, in the ordinary rail joint, the rail ends and the bars wear more rapidly at the center portion of the joint than at the end portions thereof and the center portions of the bars have to be pulled in by the center bolts to take up this wear. It is, of course, essential that the center of the joint be maintained in a tight condition and free from all looseness or play at all times. The inward movement of the center portion of the bars is resisted by the end portions of the bar which wear much less rapidly than the center portions thereof, thus rendering it necessary to flex the bars inwardly by means of the center bolts to assure close contact between the fishing surfaces of the bars and the rail ends at the center portion of the joint. This is highly objectionable, particularly when using I-beam bars such as are now in extensive use. These bars present high resistance to inward flexing and the tension to which the center bolts are subjected is so high that, in practice, a dangerously high percentage of breakage either of the center bolts or of the bars occurs. The necessity for inward flexing of the center portion of the bars is due, primarily, to the relation between the fishing contact area of the bars and the rails at the end and the center portions of the joint. In rail joint bars of present day construction the fishing surface of the bar is the same at the end portions thereof as at the center portion. As is well known to those skilled in the art, the greatest wear occurs at the center portion of the joint. As a result the rate of wear at the center portion, that is the center one-third or one-fourth, of the bar is greater than at the end portions thereof. After the bar has been in service for some time the wear of the center portion thereof is so much greater than the end portions as to necessitate excessive inward flexure of the center portion of the bar which, for the reasons above pointed out, is highly objectionable. Hence in the case of I-beam or laterally rigid bars, in which flexure of the center portion is practically impossible. The center portion has been defined as one-third or one-fourth of the bar which in a long 36″ bar would be not more than 12″ and in a short bar not more than 8″. Bending in the worn center portion of the bar would be equivalent to bending it between supports 12″ or less apart, which requires such enormous pressure that even the modern heat treated bolt would pull apart before the center portion of the bar was pulled or brought into the rail ends.

In my copending application for balanced wear bar, filed March 28, 1929, Serial No. 350,734, I have disclosed a rail joint bar in which the end portions of the fishing surfaces of the bar are so related to the center portions of such surfaces as to obtain a substantially uniform rate of wear of the bar throughout the whole length thereof. The bar is thus maintained in parallelism with the rail ends throughout the life of the joint and excessive flexing of the bar, with consequent excessive tension on the bolts, is avoided. I have also disclosed, in my copending application for tight center bar, filed March 25, 1929, Serial No. 349,567, a rail joint bar in which the end fishing surfaces are so related to the center fishing surfaces that the ends of the bar wear somewhat more rapidly than at the center portion thereof thus assuring tight contact at the center of the bar at all times while avoiding excessive inward flexing of the bar, particularly at the center portion thereof. The bars of my two applications, above identified, are highly efficient in use but, in producing these bars, the employment of accurately formed dies is necessary and but slight tolerance is permissible. I have found that it is possible to produce a bar which does not require the same accuracy in forming the fishing surfaces as these bars of my two copending applications above identified, and which possesses long life while avoiding excessive lateral flexing of the bar, by relating the areas of the end fishing surfaces of the bars to the center portions of the fishing surfaces thereof in a novel manner not disclosed in either of my above mentioned copending applications.

In accordance with my present invention I so relate the end fishing surfaces of the bar to the center fishing surfaces thereof that the relation between the bars and the rail ends changes by wear, in the use of the joint, in such manner as to assure long life of the bar while eliminating excessive lateral flexing thereof, particularly inward flexing of the center portion of the bar, and also avoiding excessive tension on the bolts. A further important feature of my invention is that in the initial fitting of the bar, that is when the bar is first applied in the joint, it is not subjected to lateral flexure either at the ends or the center, and the bolts are all in equal tension while none of the bolts are under excessive tension. It is highly important in rail joints that the bars be accurately fitted initially, as the subsequent wear of the joint and the length of life thereof depends largely upon the accurate fitting of the bars when initially applied. If the bars are fitted properly at first they will wear properly and in the manner intended, in the use of the joint, with the result that the fishing surfaces of both the bars and the rail ends will wear as intended and the length of life of the joint will consequently be greater than if the bars were improperly fitted. A further object of my invention is to provide a bar which, in use, changes its character due to wear, such bar when initially applied being of a novel type and, in the use of the joint, becoming a bar of ordinary type, that is, a bar in which the area of contact of the end portions of the fishing surfaces thereof becomes equal to the area of contact of the center portions of such surfaces. Another object is to provide a bar in which advantage is taken of the wear of the fishing surfaces of the bar to increase the length of life thereof. Further objects and advantages of my invention will appear from the detailed description.

Figure 8:
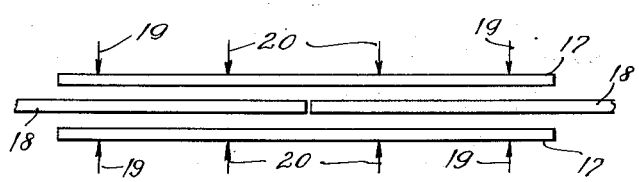
Figure 9:
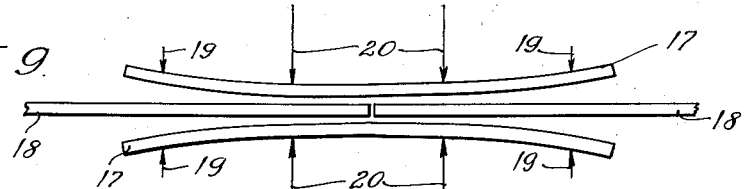
Figure 10:
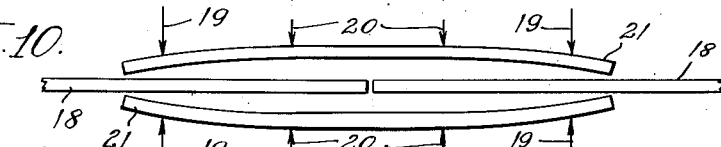
Figure 11:
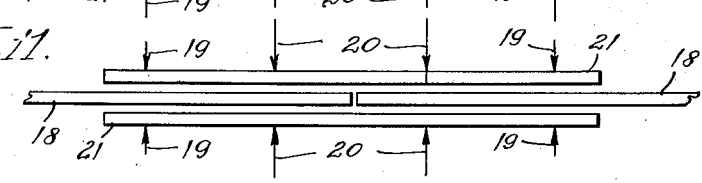
Figure 12:
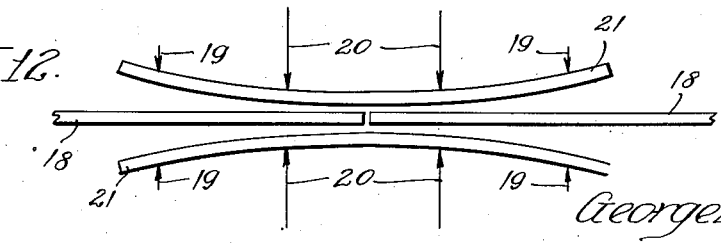
Figure 13:
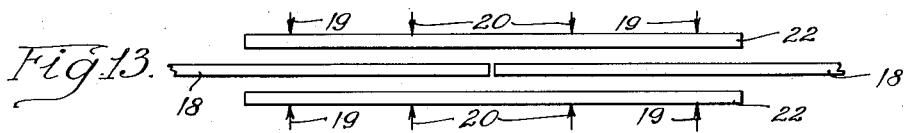
Figure 14:
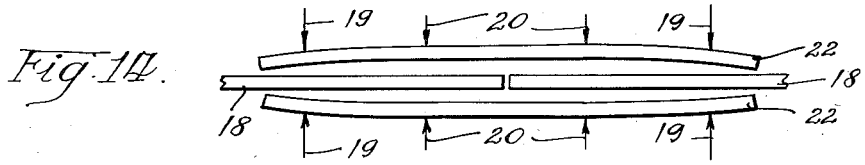
Figure 15:
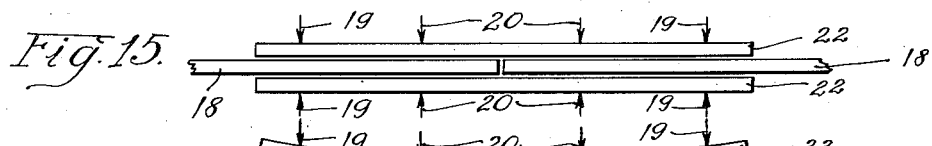
Figure 16:
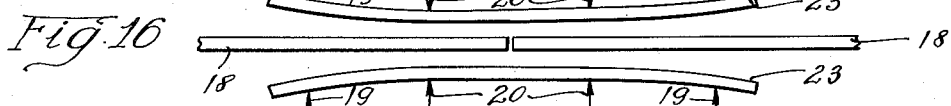
Figure 17:
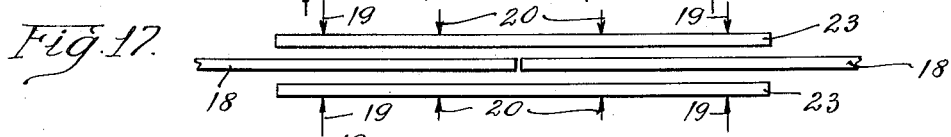
Figure 18:
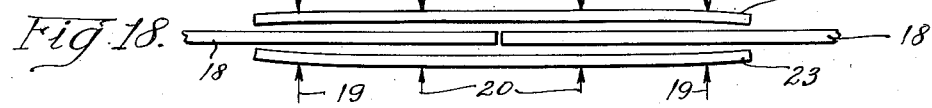
Figure 19:
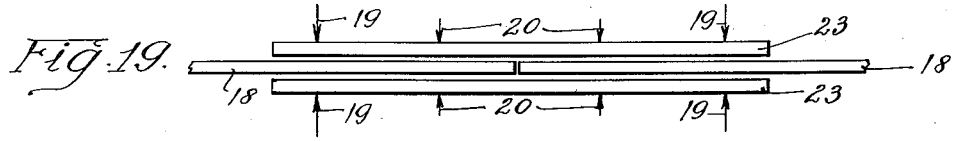
Figure 20:
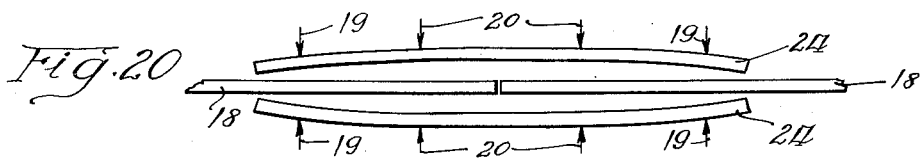
Figure 21:
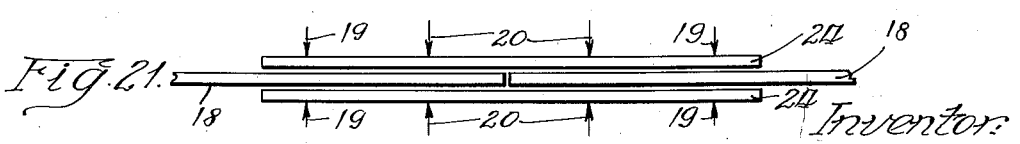

In the drawings:

Figure 1 is an underneath perspective view of a rail joint bar constructed in accordance with my invention, Figure 2 is an end view of the bar of Figure 1 as applied, Figure 3 is an end view of the bar, as applied, at the end of its life, Figure 4 is an end view of a modified form of bar as applied, Figure 5 is a top perspective view of the bar of Figure 4, Figure 6 is an underneath perspective view of a second modified form of bar, Figure 7 is an elevation of a crowned bar, Figure 8 is a diagrammatic plan view illustrating the relation between uncrowned rail joint bars of ordinary type, and the rail ends, when the bars are initially applied in a joint, the arrows indicating the bolts and the length of the respective arrows indicating the bolt tension, Figure 9 is a diagrammatic plan view illustrating the relation between the bars of Figure 8 and the rail ends, and the bolt tensions, after the bar has been in service for some time, Figure 10 is a plan view illustrating diagrammatically the relation between crowned bars of ordinary type and the rail ends, when the bars are initially applied in a joint, the arrows indicating the bolts and the length of the respective arrows indicating the bolt tension, Figure 11 illustrates, diagrammatically, the relation between the bars and the rail ends, as well as the bolt tension, after the bars of Figure 10 have been in use for a sufficient time to wear down the center crowning of the bars, Figure 12 shows, diagrammatically, the relation between the bars and the rail ends, and the bolt tensions, after the bars of Figure 10 have been in use for a further period of time, Figure 13 is a diagrammatic plan view of a rail joint embodying the principle of my invention, showing the relation between the bars and the rail ends when the bars are initially applied, the arrows indicating the bolts and the bolt tensions, Figure 14 is a view similar to Figure 13 after these bars have been in use for some time, Figure 15 is a view similar to Figure 13 after these bars have been in use for a further period of time and as these bars approach the end of their life, Figure 16 is a diagrammatic plan view illustrating the use of one form of crowned bar constructed in accordance with my invention, this view showing the relation between the bars and the rail ends when the bars are initially applied, Figure 17 is a view similar to Figure 16 illustrating the relation between the bars and the rail ends after the bars have been in use a short time, Figure 18 is a view similar to Figure 16 and illustrating the relation between the bars and the rail ends after the bars have been in use for a further period of time, Figure 19 is a view similar to Figure 17 after the bars have been in use for a still further period of time and are approaching the end of their life, Figure 20 is a diagrammatic plan view illustrating a second form of crowned bar in accordance with my invention as applied in a joint, and Figure 21 is a plan view illustrating the relation between the bars of Figure 20 and the rail ends after the bars have been in service for some time and are near the end of their life.

In Figures 1, 2 and 3 I have shown a bar constructed in accordance with my invention, this bar being shown as applied in Figures 2 and 3. My bar comprises a web 1, head 2 and flange 3 being, in general, of known section. The head 2 is provided with a fishing surface 4 which is of uniform width throughout the length of the bar and contacts fishing surface 5 at the underface of head 6 of rail 7. Flange 3 of the bar is provided, on its undersurface, with a fishing element 8 comprising a central portion 8$^a$ and end portions 8$^b$ which taper in width from the ends of the central portion to the ends of the bar. It will thus be seen that the end fishing surfaces of the bar, that is, the fishing surfaces at the end portions of the bar, are of less area than the fishing surface at the center portion thereof and decrease in area toward the ends of the bar. The relation between the end portions of the fishing area 8 and the center portion 8$^a$ thereof is such that the rate of wear of the fishing at the end portions of the flange of the bar is somewhat greater than at the center portion thereof. The vertical thickness of the fishing element 8, that is, the distance to which this element extends downwardly from the underface of flange 3, is such that after the bar has been in service in a joint for a predetermined time the element 8$^a$ becomes worn away. When this occurs the bearing surface at the end portions of the bar becomes of the same width as the bearing surface at the center portion of the bar, the bar thus becoming, by wear, a bar of ordinary type such as is now commonly used in rail joints and in which the head bearing or fishing surface and the flange fishing surface are each of uniform width throughout the length of the bar. The fishing element 8 bears upon the fishing area of flange 9 of rail 7 the bars being bolted together and pulled inwardly into fishing contact with the rail ends by bolts 10 in a manner well known in the art.

In Figure 2 I have illustrated, in end view, my bar as applied to a rail end 7. In this figure it will be noted that the width $a$ of the end fishing 8$^b$ is much less than the width $b$ of the center portion 8$^a$ of the flange fishing surface. In this view the vertical thickness of the fishing element 8 is indicated at $c$.

In Figure 3 the bar is illustrated after the fishing element 8 has been completely worn away and the bar has been in use for some time thereafter, it being considered in this view that the bar is approaching the end of its life. It will be noted that the width $d$ of the fishing surface at the end of the bar is equal to the width $b$ of the center portion of the fishing surface in Figure 2 so that, after the fishing element 8 has been worn away the bar becomes a bar of ordinary type. From this point on, in the continued use of the bar, the center portion of the bar will wear more rapidly than the end portions thereof as above pointed out. The bar of Figures 2 and 3 preferably has the outer portion of flange 3 bent upwardly at an angle to provide easement 11 after the fishing element 8 has been completely worn away. This easement is not essential, but is preferably provided in order that the fishing contact between the flange of the bar and the rail flange may not be of excessive width. It will be understood, however, that this easement is not essential to my invention and may be provided or not as desired or as conditions may require. It will be noted that in Figure 2 I provide ample draw space 12 and 13 between the head 2 and the heel of the bar and the web of the rail. In Figure 3 the bar is illustrated as having been drawn inwardly so as to utilize substantially all of the draw space, this bar being at the end of its life when all of the space is used up.

In Figures 4 and 5 I have illustrated a slightly modified form of bar in which the head 2 is provided with a fishing element 14 comprising a center portion 14$^a$ and end portions 14$^b$ which taper in width from the ends of the portion 14$^a$ to the ends of the bar. The vertical height or thickness of the fishing element 14 is such that this element is worn completely away in the use of the bar before the end of the life of the bar, in the same manner as the fishing element 8 of flange 3. The construction and use of the bar of Figures 4 and 5 are essentially the same as those of the bar of Figures 1, 2 and 3 the only difference being that, in the bar of Figures 4 and 5, the fishing surface at the center portion of the head is greater than at the end portions thereof and decreases from such center portion toward the end of the bar.

In Figure 6 I have illustrated another modified form of bar in which the flange 3 is provided at its underface with a fishing element 15 the center portion 15ª of which is of greater area than the end portions 15ᵇ, these end portions tapering in width towards the ends of the bar and having their outer ends spaced away from the heel of the bar. This form of bar is similar to that of Figure 1 except that the end portions 15ᵇ of the fishing surface are disposed reversely to the corresponding portions of the fishing surface of the bar of Figure 1. In all other respects the construction and operation of the bar of Figure 6 are similar to those of the bar of Figures 1, 2 and 3.

In Figure 7 I have illustrated semi-diagrammatically, and in elevation, a crowned bar 16 constructed in accordance with my invention. The bar shown is crowned both at the head and the flange. In practice, either the head, or the flange, or both, may be crowned as desired or as conditions require. Crowned bars are now well known in the art and need not be illustrated nor described in detail, it being sufficient to note that Figure 7 illustrates a crowned bar which is, in general, of known construction, this bar having either its head or its flange fishing surface, or both, constructed in accordance with my invention.

For purposes of comparison, and to facilitate the description of my invention and the advantages thereof, I have illustrated, diagrammatically, in Figures 8 to 12 the relation between the bars and the rail ends, and the bolt tensions, in rail joints of ordinary construction. In Figure 8 I have illustrated a rail joint comprising uncrowned bars 17 of ordinary construction applied at the opposite sides of the rail ends 18. These bars are bolted together by end bolts indicated by the arrows 19 and center bolts indicated by the arrows 20, the bars being straight throughout their length. In a joint thus constructed, which may be considered as typical of the ordinary rail joints, the bars when initially applied are disposed in parallel relation to the rail ends, these bars not being flexed laterally and the bolts being under equal tension as indicated by the equal lengths of the arrows 19 and 20. As stated, the bars 17 are of ordinary construction so that the head fishing surface and the flanged fishing surface, respectively, is of uniform width throughout the length of the bar. As use of the joint continues, these bars wear more rapidly at the center portion thereof than at the end portions and this wear is taken up by pulling in the center portions of the bars by means of the center bolts 20. After the joint has been in service for some time the center portions of these bars are flexed or bent laterally inwardly toward the rail ends, which is essential to take up the wear at the center portion of the joints. Under such conditions the bars are placed under severe lateral flexure and the center bolts are subjected to excessive tension as indicated by the length of the arrows 20, the tension of the end bolts being but slight as indicated by the length of the arrows 19. This inward flexing of the center portions of these bars 17 is highly objectionable, particularly when applied to bars of complicated cross sections, such as the I-beam type of bar now extensively used, and is responsible for a dangerously high percentage of breakage both of the bars and the bolts.

In Figure 10 I have illustrated a joint employing bars 21 which are crowned at the center for end tension. When these bars are first applied in the joint the ends thereof are bowed inwardly toward the rail ends 18 to hold the crowned centers of the bars in contact with the rail ends at the center portions of the joint. Under such conditions the end bolts are under greater tension than the center bolts as indicated by the relative lengths of the arrows 19 and 20. In bars of this type the center crowning quickly wears away and the center portion of these bars is forced inwardly toward the rail ends by the center bolts, the bars soon becoming substantially parallel with the rail ends as in Figure 11. At such time the tension on the center bolts is substantially equal to that on the end bolts, as indicated by the relative lengths of the arrows 20 and 19. After the crowning at the center portions of these bars has been worn away, these bars wear more rapidly at the center portion thereof than at the ends and have to be bent or flexed inwardly toward the rail ends 18 to take up this center wear, these bars eventually assuming the bowed condition of Figure 12. Under such conditions, the bars are subjected to excessive lateral stresses and the tension on the center bolts becomes excessive while the tension on the end bolts is relatively small, as indicated by the relative lengths of the arrows 19 and 20. It will thus be seen that, even when using crowned bars, these bars inevitably become flexed or bowed inwardly at their center portions, as in Figure 9, so that the bars are subjected to excessive lateral flexing and the center bolts are subjected to excessive tension. This difficulty encountered in rail joints of present day construction is inherent in the construction of these joints due to improper relation between the wear of the fishing surfaces at the end portions of the joints and the fishing surfaces at the center portion thereof. It is the primary object of my invention to avoid this objection to rail joints of present day construction while providing a bar of comparatively simple and inexpensive construction by the use of which this desired result is obtained.

In Figures 13, 14 and 15 I have illustrated, diagrammatically, a rail joint constructed in accordance with my invention showing the relation between the bars and the rail ends, and the bolt tension, during different periods of the life of the joint. In Figure 13 I have illustrated two bars 22 constructed similarly to the bar of Figures 1, 2 and 3, or the bar of Figure 4. These bars are uncrowned and are straight, that is, are straight throughout their length. These bars 22 are disposed in parallelism to the rail ends 18 and are bolted thereto, the bolt tensions being equal at the ends of the bars and at the centers thereof, as indicated by the equal lengths of the arrows 19 and 20. After the bars 22 have been in service for some time the end portions thereof are bent inwardly slightly toward the rail ends 18, as illustrated in Figure 14. This is due to the fact that the end portions of the fishing surfaces of the bars wear more rapidly than the center portions of such surfaces, during the first part of the life of the joint, as previously explained. At such time, the bars are bowed slightly at the ends, as in Figure 14, the tension of the end bolts being greater than the tension of the center bolts, as indicated by the relative lengths of the arrows 19 and 20. It is particularly noted, however, that the tension of the end bolts is not excessive and the inward bowing of the ends of the bars is slight. By the time the end portions of the bars have become bowed inwardly to the extent illustrated in Figure 14, the original fishing element on the flange of these bars, or the original fishing elements on the flanges and the heads of the bars, as the case may be, have been completely worn away. From this point on the wear at the center portion of the bar is more rapid than at the end portions thereof so that the center portion of the bar moves inwardly more rapidly than the end portions thereof as the bolts are tightened up to take up wear, this continuing until the bars are again parallel with the rail ends, as in Figure 15. The contact or fishing elements and areas of the bars, referred to, are preferably so disposed and related that the bars are disposed in their final parallel relation to the rail ends at the end of the life of the bars, that is, when the draw space between the bars and the rail web has been completely used up. It will be noted that by constructing the joint in this manner excessive lateral flexing of the bars, particularly at the center portion thereof, is avoided and I also avoid subjecting the bolts, either center or end, to excessive tension. It will further be noted that the center bolts 20 do not, at any time, have the tension thereon increased, which is advantageous since the most severe stresses are encountered at the center portion of the joint. It will also be noted that, in the final position of the bars illustrated in Figure 15, the bolts are all subjected to equal tension. By my invention I not only assure proper initial fitting of the bars without subjecting the bars or the bolts to undesirable stresses or tension, but I also maintain the bars in proper relation to the rail ends throughout the life of the joint without subjecting them to excessive lateral stresses, particularly at the center portions of the bars, while having the bars and the bolts free from lateral stresses and excessive tension during the latter portion of the life of the joint.

In a stretch of track in which the rails were laid on the same date, there is no great variation in joint wear. It is possible, therefore, to provide bars either straight or previously curved to suit conditions in a given stretch of track, such bars being suitably crowned to fit the normal worn recesses of the rail ends but having no tension crowning such as is necessary in the ordinary crowned bar to assure a tight center by end flexing of the bar. This end flexing of the bar is not necessary in my bar in view of the fact that no subsequent center flexing inward of the bar is encountered after the initial application thereof in the joint. When a straight crowned bar is used it is initially applied to the rail ends in parallelism therewith. The condition of such a bar when applied and its subsequent wear and final relation to the rail ends is the same as that illustrated in Figures 13, 14 and 15. The straight uncrowned bar is not suitable for worn rails because it would not fit the rails at center without bending inward. Inasmuch as the end fishing surfaces of my bar are reduced to permit more rapid wear and take-up than is possible in bars of ordinary uniform fishing, slight initial bending in at the center by bolt tension is not seriously objectionable for an initial fitting, since the more rapid end wear will soon cause the bars to straighten themselves assuming the position of initial fitting as in an originally straight uncrowned bar with reduced end fishing areas such as shown in Figure 13. However, there are cases where it is desired to fit worn rail ends with crowned bars without initial flexing inward of the ends or center, and at the same time use a bar of established height with crown at the central portion, the one pattern serving for varying degrees of rail end wear ranging within reasonable limits which may be defined as considerable, moderate and slight wear. A crowned bar with reduced end fishing surfaces would be designed to fit moderate wear without center or end flexure and be made straight, also, remaining straight when first bolted to the rails, in its performance being similar to the uncrowned bar of my invention as in Figures 13, 14 and 15. In the case of considerable wear, this same bar would not fill the rail end gaps at center without being bent inward by the center bolts, and to avoid this initial bolt tension, the bar is curved laterally before being applied, the outer side of the bar being concave.

In Figures 16 to 19 I have illustrated a crowned bar constructed in accordance with my invention as applied, and have indicated diagrammatically the wear of such a bar and its changed relation to the rail ends. Referring to Figure 16, I have shown two bars 23, such bars being crowned at center portion for abnormal wear of the rail ends. These bars are preferably bowed or curved lengthwise with the end portions thereof curved outwardly away from the rail ends 18, as illustrated. The fishing surfaces of these bars, either the head or the flange surfaces, or both, are constructed in accordance with my invention and in the manner previously described. When the bars are initially applied the bolts are all under equal tension, the bars being curved as illustrated, and the center portions of the fishing surfaces of the bars contacting the corresponding portions of the fishing surfaces of the rail ends. The bars wear more rapidly at their ends than at their center portions, and after the joint has been in use for some time these bars become parallel to the rail ends, as in Figure 17, at which time the end bolts are under somewhat greater tension than the center bolts as indicated by the relative lengths of the arrows 19 and 20. Continued use of the bars results in the ends thereof moving inwardly toward the rail ends 18 somewhat beyond the center portions of the bars so that these bars are now bowed or bent inwardly slightly at their ends as in Figure 18, the end bolts being under slightly increased tension as indicated by the lengths of the end arrows 19. At this time the bars 23 occupy substantially the same relation to the rail ends 18 as the bars 22 of Figure 14. When the bars have reached the position of Figure 18 the original fishing element of these bars has been worn away so that the bars have now become bars of ordinary type and wear faster at their center portions than at their end portions. Continued use of the bars results in the end portions thereof moving inwardly less rapidly than the center portions thereof so that the bars again become parallel with the rail ends 18, as in Figure 17 but are positioned much closer to the rail ends, as in Figure 19. At such time, the tension of the end bolts is greater than that of the center bolts, as indicated by the relative lengths of the arrows 19 and 20. Preferably the bars 23 do not attain their final position of parallelism to the rail ends 18 until at or about the end of the life of said bars, that is, until substantially all of the draw space has been taken up. It will thus be seen that a bar constructed in this manner and crowned and bowed outwardly at its ends as in Figure 16, is well adapted for use in rail joints in which the ends of the rails have been subjected to abnormal wear, and such bars constructed and applied in this manner have unusually long life. The same bar as is used on rail ends for moderate and considerable wear may also be used on rail ends having but slight wear, without initial flexing inward at the ends or center, the bar being curved convex outwardly.

In Figure 20 I have illustrated a joint comprising bars 24 which are crowned for subnormal wear of the rail ends. These bars are curved outwardly at their center portions with their end portions curved inwardly toward the rail ends. When these bars are initially applied the bolt tension at the ends is equal to the bolt tension at the center, as indicated. As wear of the bars progresses, the original fishing elements thereof are worn away, after which the bars move inwardly more rapidly at the center thereof than at the ends until they assume parallelism with the rail ends 18, as in Figure 21. At this time the tension of the center bolts is somewhat greater than the tension of the end bolts, as indicated by the relative lengths of the arrows 20 and 19. Preferably the bars 24 assume their final parallel relation to the rail ends 18 at approximately the end of the life of such bars.

It is particularly pointed out that in using my bar, whether crowned or uncrowned, and whether straight or concave either inwardly or outwardly at its center portion, the bar is not subjected to excessive lateral flexure at its center portion at any time and the bolts are under equal tension and the bar is free from lateral flexure when the bar is initially applied in the joint. This is advantageous as assuring accurate fitting of the bar and, consequently, accurate wear and long life thereof.

My invention is particularly adapted to broad flanged fishing bars such as illustrated in Figures 2 and 4, which would be rather difficult to reform in dies having forming surfaces for accurately shaping the fishing surfaces of the bar. I find that it is possible to form the fishing surfaces on such bars, with a proper degree of accuracy, by employing dies so related as to relieve, to a certain extent, the pressure on the end portions of the bar relative to the pressure at the center portion thereof, as the dies are closed. In such a set of dies, the bar would be subjected to less pressure at its end portions than at its center portion with the result that the fishing surfaces at the ends of the bar would be of less area than at the center portion thereof. This avoids the necessity of using expensive dies accurately formed to produce the desired fishing surfaces. Also, in the bar of the instant type it is possible to have considerable tolerance so long as the end portions of the fishing surfaces, as initially formed, wear more rapidly than the center portions of such surfaces during an appreciable portion of the life of the bar. This is possible because there is more leeway to accommodate any slight inaccuracies, due to the fact that the end fishings of the bar wear away, after which the fishing surfaces at the ends become equal to the fishing surfaces at the center portion of the bar, from which point on the center portion wears more rapidly than the end portions until the bar becomes again parallel to the rail ends, which occurs at the end of the life of the bar. This leeway to permit of greater tolerance is even greater in the case of the bar of Figure 16. This invention has to do particularly with the carrying out of the principle of reduced end fishing areas, as disclosed in my copending applications previously referred to, by simple and economical methods similar to those employed in the reforming of worn bars in dies in a press, the method used in reducing the end fishing areas being impositive, whereas in my copending application as above identified the reduction is positive, being accomplished by direct indentation, displacement or shifting of metal so that the line between the contacting and non-contacting fishing surface is sharply defined, the non-contacting area being effectually blocked off so that it remains out of contact with the rail ends for all or a large part of the life of the joint. Impositive methods by which the bar of my invention may be produced are disclosed in my patent for means for reforming worn angle bars, Patent No. 1,713,506 dated May 14, 1929, and in my copending application for method of and die for making bars, Serial No. 354,142, filed April 20, 1929. My patent, and copending application, just referred to, show how, by converting pressure in one direction into pressure in a substantially right angular direction, the broad flange fishing surface at the center is reformed. By making the head and flange end portions of the bar thinner at the central than at the end portion, vertically, the head and flange fishings are reduced at the end portions to produce the bar of my present invention. The effect in the reformed bar is much like that of Figures 1 and 5, although the line of demarkation is an arc, the contacting fishing surfaces being shiny and polished, the non-contacting fishing surfaces being dull and unfinished, the contrast between such surfaces being clearly distinguishable and the arcuate boundary line between the two, clearly defined. The amount of end fishing area reduction increases as the pressure on the vertical thickness of the flange at the end is relieved, and this pressure may be relieved so that the fishing area tapers off almost to a point at the extreme end, the angle of fishing being slightly less to the horizontal than the contacting fishing angle. The effect is that I secure simply, cheaply and in a novel manner, the advantages of reduced end fishing for a large part at least of the joint play, the bar being changed by wear from one of my present invention to one of ordinary type.

It is possible, also, to provide a bar with the desired fishing elements thereon by bulldozing, machining, or grinding. It is evident, therefore, that the bar of my invention may be produced in various ways, the advantage of constructing the bar in the manner illustrated and described, from the standpoint of production, being that I eliminate the necessity for absolute accuracy in the forming of the fishing surfaces and thus avoid having to use expensive and accurate dies such as should be used in producing the bars of my two copending applications above identified. A distinguishing characteristic of my bar, and one which I believe to be broadly new, is that it is initially a bar of new type and, after being in use in the joint for some time it becomes, by wear, a bar of ordinary type. This change in type of the bar, by wear, is of importance as greatly prolonging the life of the bar as compared to a bar of ordinary type and, also, as permitting of greater tolerance in the areas and vertical thickness of the fishing element.

It is apparent from the preceding description, that the terms "new" and "ordinary" refer to the fishing surfaces of the bar and should be construed accordingly. It is also apparent that the fundamental principle of my invention resides in constructing or arranging the fishing surfaces in such manner, that when the bar is initially applied in a joint the area of fishing contact at the center of the joint bears a predetermined relation to the area of fishing contact at each end of the joint, this relation being altered in a definite manner by wear of the bar in use. Preferably, this relation is such that the center portion of the fishing area wears at a slower rate than the end portions of such area during the first part of the life of the joint, and the area of fishing contact at the end portions of the fishing area is increased by wear of the bar in the joint so that the rate of wear at such end portions becomes more nearly equal to the rate of wear at the central portion during the succeeding part of the life of the joint. Various constructions may be resorted to to accomplish the desired results and I do not, therefore, limit my invention to the particular constructions of bars illustrated by way of example only. Furthermore, my invention is not strictly limited to converting a bar of one type into a bar of another type, though this is the preferred means of accomplishing the desired results, but comprehends any suitable construction or arrangement whereby the desired results alone set forth may be accomplished.

What I claim is:

1. In a rail joint, in combination with the rail ends, angle bars bolted to the rail ends and having fishing elements contacting the corresponding fishing surfaces of the rails, certain of said elements projecting vertically beyond the associated elements of the bar and the vertical thickness of such elements being of proper value to assure that the projecting fishing elements are completely worn away to the contiguous surfaces of the associate elements of the bar prior to the end of the life of the bar in service in the joint, the bar having fishing contact at its center and end portions with the rail ends.

2. In a rail joint, in combination with the rail ends, angle bars bolted to the rail ends and having fishing elements contacting the corresponding fishing surfaces of the rails, certain of said elements projecting vertically beyond the associated elements of the bar and the fishing surfaces at the end portions of such elements being of different area of contact than at the center portions thereof, said certain elements being of such vertical thickness as to assure that said projecting fishing elements are completely worn away to the contiguous surface of the associated element of the bar prior to the end of the life of the bar in service in the joint.

3. In a rail joint, in combination with the rail ends, angle bars bolted to the rail ends and having fishing elements contacting the corresponding fishing surfaces of the rails, one of said elements being of less area of fishing contact at its end portions than at its center portion, the vertical thickness of said element being such as to assure that said element will be worn completely away to the contiguous surface of the associated element of the bar prior to the end of the life of the bar in service in the joint.

4. In a rail joint, in combination with the rail ends, angle bars bolted to the rail ends and having fishing elements contacting the corresponding fishing surfaces of the rails, one of said elements being of sufficiently less area of contact at its end portions than at its center portion to cause the bar to wear more rapidly at its end portions than at its center portion during the first part of the life of the bar, the vertical thickness of said element being such as to assure that such element will be completely worn away to the contiguous surface of the associated element of the bar during the first part of the life thereof.

5. In a rail joint, in combination with the rail ends, angle bars bolted to the rail ends and having fishing contact therewith, the area of fishing contact at the end portions of the bars being so related to the area of fishing contact at the center portions of the bars, when the bars are initially applied, as to cause wear at the end portions of the bars to progress more rapidly than at the center portions thereof, the fishing elements of the bars being so related to the associated angle elements of the bars as to be worn away to said angle elements when the bars have been in service for a predetermined period, the fishing surfaces of the bars being thereafter of equal area throughout the length of the bars.

6. In a rail joint, in combination with the rail ends, angle bars bolted to the rail ends and having fishing contact therewith, said bars when initially applied being of a type adapted for more rapid end wear than center wear in use and for a predetermined period, the bars being adapted to be converted by wear into bars of a second type having more rapid center wear than end wear during a second period in the life of the joint.

7. In a rail joint, in combination with the rail ends, angle bars bolted to the rail ends and having fishing contact therewith, said bars when initially applied being under equal bolt tension and of a type adapted for more rapid end wear than center wear in use and for a predetermined period, the bars being adapted to be converted by wear into bars of a second type having more rapid center wear than end wear during a second period in the life of the joint.

8. In a rail joint, in combination with the rail ends, angle bars bolted to the rail ends and having fishing contact therewith, the bars being crowned and curved lengthwise to assure proper fishing contact at the center portion of the joint when applied to worn rail ends, said bars when initially applied being under equal bolt tension and of a type adapted for more rapid end wear than center wear in use for a predetermined period, the bars being adapted to be converted by wear into bars of a second type having more rapid center wear than end wear during a second period in the life of the joint.

9. In a rail joint, in combination with the rail ends, angle bars bolted to the rail ends and having fishing contact therewith, the bars being crowned and curved lengthwise to assure proper fishing contact at the center portion of the joint when applied to worn rail ends, said bar being under equal bolt tension and free from lateral flexure when initially applied.

10. A rail joint angle bar adapted for fishing contact at its center and end portions, comprising a fishing element projecting vertically from one of the angle elements of the bar and of less fishing contact area at its end portions than at its center portion, the vertical thickness of said fishing element being such as to assure that it will be completely worn away in the use of the bar in a joint and prior to the end of the life of the bar in the joint.

11. A rail joint angle bar adapted for fishing contact at its center and end portions, comprising a fishing element projecting from the under face of the flange of the bar and of less fishing contact area at its end portions than at its center portion, the vertical thickness of said element being such as to assure that it will be completely worn away in the use of the bar in a joint and prior to the end of the life of the bar in the joint.

12. In a rail joint, bars of one fishing type bolted to the rail ends and adapted to be converted by wear into bars of a second fishing type in which the relative rate of wear between certain portions of the bearing surfaces is different than in the first type of bar.

13. A rail joint angle bar adapted for fishing contact at its central and end portions, comprising a flange fishing contacting area narrowing from the central portion to each end, the non-contacting end fishing areas being slightly displaced so as to come in contact with the corresponding rail flange surfaces after wear and under bolt tension, when the bar has undergone service in a rail joint.

14. A rail joint angle bar adapted for fishing contact at its central and end portions, comprising head and flange fishing contacting areas narrowing from the central portion to each end thereof, the non-contacting end fishing areas being slightly displaced so as to come in contact with the corresponding rail head and flange surfaces after wear and under bolt tension, when the bar has undergone service in a rail joint.

15. In a rail joint, bars bolted to the rail ends, said bars being adapted for top and bottom fishing contact at their center portions and end portions, and being parallel to the rail ends when first applied, each of said bars comprising a fishing surface of full width contact with the rail ends at the center portion of said fishing surface and of reduced width contact with the rail ends at each side of said center portion, said reduced width contacts becoming full width contacts by wear and bolt tension when the bars have undergone service in the rail joint.

16. In a rail joint, bars bolted to the rail ends and having head and foot fishing contact therewith, one of the fishing surfaces of the bars having greater width of fishing contact with the rail ends at its center portion than at its end portions when the bars are initially applied, the center and end portions of said fishing surface being so related that the width of fishing contact of the end portions relative to the center portion increases with wear and take up of the bar in use in the joint.

17. In a rail joint, bars bolted to the rail ends and having head and foot fishing contact therewith, one of the fishing surfaces of the bars having a center portion and end portions so related that the rate of wear of the end portions is different from that of the center portion during the first part of the life of the joint and becomes more nearly equal to that of the center portion during the succeeding part of the life of the joint due to wear and take up of the bar in use in the joint.

18. In a rail joint, bars bolted to the rail ends and having head and foot fishing contact therewith, one of the fishing surfaces of the bars having a center portion and end portions so related that the area of fishing contact with the rail ends is less at each of the end portions than at the center portion during the first part of the life of the joint and is increased by wear and take up of the bars so as to more nearly equal the area of contact at said center portion during the succeeding part of the life of the joint.

19. In a rail joint, bars bolted to the rail ends and having head and foot fishing contact therewith, one of the fishing surfaces of the bars having a center portion and end portions so related that the area of contact per unit of length with the rail ends is less at each of the end portions than at the center portion during the first part of the life of the joint and is increased by wear and take up of the bars so as to more nearly equal that of said center portion during the succeeding part of the life of the joint.

20. A rail joint bar adapted for top and bottom fishing contact at the center and end portions, comprising a fishing surface with full width contact at its center portion, other portions of said fishing surfaces adjacent said central portion being slightly and abruptly displaced, so that when the bar is bolted to rail ends to form a joint, said other portions of said fishing surfaces are in reduced width contact with the rail ends, becoming in full width contact by wear and bolt tension when the bar has undergone service in a joint.

21. In a rail joint, in combination with worn rail ends, crowned joint bars at opposite sides of the rail ends and having center and end contact therewith, said bars being substantially free from lateral flexure when initially applied to the rail ends.

22. In a rail joint, in combination with the rail ends, crowned joint bars at opposite sides of the rail ends and having both center and end fishing contact therewith, the crowned elements of said bars being curved lengthwise and the bars being substantially free from lateral flexure when initially applied to the rail ends.

23. As a new article of manufacture, a rail joint bar provided with a crowned element curved lengthwise when the bar is out of a joint and free from lateral tension, said bar being adapted for both center and end fishing contact with the rail ends when applied in the joint and said element retaining substantially its original curvature when the bar is initially applied in the joint.

24. As a new article of manufacture, a crowned rail joint angle bar permanently curved lengthwise and adapted to retain substantially its original curvature when initially applied in a rail joint and in fishing contact with the rail ends.

25. As a new article of manufacture, a crowned rail joint bar permanently curved lengthwise and adapted to retain substantially its original curvature when initially applied in a rail joint and in center and end fishing contact with the rail ends, the outer side of the bar being concave.

26. An angle bar for joining adjacent ends of railroad rails, said bar having a head and an outwardly projecting flange, the head and the flange having bearing surfaces disposed for contact with the corresponding bearing surfaces of the rail ends, said bar being laterally convexed when it is out of a joint and free from lateral tension, the end portions of one of said bearing surfaces having less area of contact per unit of length than the center portion of such surface.

27. A rail joint bar adapted for top and bottom fishing contact at its center and end portions, comprising a fishing element projecting vertically from one of the elements of the bar and of less fishing contact area per unit of length at its end portions than at its center portion, said projecting element being so related in vertical thickness and conjunction with the contiguous surface of the associated element of the bar as to substantially increase the originally reduced end fishing contact area in the use of the bar in a joint and prior to the end of the life of the bar in the joint.

28. A rail joint including the rail ends and a joint bar having a primary and a secondary rail fishing contact surface on one of its fishing bearing members, said primary and said secondary surfaces being of different areas and lying in substantially parallel planes.

29. A rail joint bar having rail fishing contact surfaces at its center portions and end portions, one of said surfaces comprising a primary and a secondary rail contact surface of different areas at each of its end portions, the center portion having a primary surface only.

30. In a rail joint, bars bolted to the rail ends and having center and end fishing contact therewith, and means for causing the ends of the bars to move to the rail ends more rapidly than the centers of the bars by wear and bolt tension during the first portion of the life of the bars and for causing the centers of the bars to move to the rails more rapidly than the ends of the bars by wear and bolt tension during the succeeding portion of the life of the bars.

31. In a rail joint, bars bolted to the rail ends and having center and end fishing contact therewith, and means for causing the ends of the bars to be bent inwardly toward the rail by wear and bolt tension during the first portion of the life of the bars after the initial fitting and for causing the centers of the bars to be bent inwardly to the rail by wear and bolt tension during the succeeding portion of the life of the bars.

32. A rail joint bar reformed from a worn rail joint bar originally having top and bottom fishing surfaces, each of uniform width throughout the length of the bar, said reformed bar having one of its fishing surfaces restored to full width at the central portion and to greater width at the central portion than at the end portions, the width of the end portion fishing surfaces substantially increasing by wear and bolt tension after initial fitting when the bar has undergone service in a joint.

33. A rail joint bar reformed from a worn rail joint bar originally having top and bottom fisihng surfaces, each of uniform width throughout the length of the bar, said reformed bar having one of its fishing surfaces restored at the central portion, and the end portions of said fishing surface only partially restored, so that when the bar is fitted to the rail ends in a joint, the center portion of said fishing surface will have greater rail contact width than the end portions, said end portions substantially increasing in rail contact width by service in the joint and prior to the end of the life of the joint.

In witness whereof, I hereunto subscribe my name this 29th day of April, 1929.

GEORGE LANGFORD.